US010085194B2

(12) United States Patent
Tian

(10) Patent No.: US 10,085,194 B2
(45) Date of Patent: Sep. 25, 2018

(54) DATA TRANSMISSION METHOD AND ROUTER

(71) Applicant: Huawei Technologies Co., Ltd., Shenzhen (CN)

(72) Inventor: Xu Tian, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 117 days.

(21) Appl. No.: 15/176,837

(22) Filed: Jun. 8, 2016

(65) Prior Publication Data

US 2016/0286452 A1 Sep. 29, 2016

Related U.S. Application Data

(63) Continuation of application No. PCT/CN2014/081944, filed on Jul. 10, 2014.

(30) Foreign Application Priority Data

Dec. 10, 2013 (CN) .......................... 2013 1 0673547

(51) Int. Cl.
H04W 36/22 (2009.01)
H04W 28/08 (2009.01)
(Continued)

(52) U.S. Cl.
CPC ........... *H04W 36/22* (2013.01); *H04W 28/08* (2013.01); *H04W 72/0486* (2013.01); *H04L 45/24* (2013.01); *H04W 40/12* (2013.01)

(58) Field of Classification Search
CPC ........ H01R 39/08; H04L 45/24; H04W 28/08; H04W 36/22; H04W 40/12; H04W 72/0486
(Continued)

(56) References Cited

U.S. PATENT DOCUMENTS

2004/0073640 A1 4/2004 Martin et al.
2009/0010164 A1 1/2009 Wang et al.
(Continued)

FOREIGN PATENT DOCUMENTS

CN 101005456 A 7/2007
CN 101335698 A 12/2008
(Continued)

OTHER PUBLICATIONS

Partial English Translation and Abstract of Chinese Patent Application No. CN101005456, Part 1, Jun. 25, 2016, 5 pages.
(Continued)

Primary Examiner — Benjamin Lamont
Assistant Examiner — Nizam U Ahmed
(74) Attorney, Agent, or Firm — Conley Rose, P.C.

(57) ABSTRACT

A data transmission method and a router, which are used to obtain a load sharing scheme according to current status information of a network, and perform data transmission according to the load sharing scheme in order to improve data transmission efficiency, where the method includes communicating, by a first router, with a second router over multiple radio links, acquiring, by the first router, status information of each radio link, determining a transmission overhead of each radio link according to the status information of each radio link, determining load sharing of each radio link according to the transmission overhead of each radio link, and sending data to the second router according to the load sharing of each radio link.

18 Claims, 2 Drawing Sheets

(51) Int. Cl.
*H04W 72/04* (2009.01)
*H04W 40/12* (2009.01)
*H04L 12/707* (2013.01)

(58) Field of Classification Search
USPC .......................................................... 370/331
See application file for complete search history.

(56) References Cited

U.S. PATENT DOCUMENTS

| | | | |
|---|---|---|---|
| 2012/0134257 A1 | 5/2012 | Knox | |
| 2012/0260296 A1* | 10/2012 | Mallet | H04L 47/38 725/62 |
| 2014/0334306 A1 | 11/2014 | Yang et al. | |
| 2017/0201850 A1* | 7/2017 | Raleigh | H04W 4/001 |

FOREIGN PATENT DOCUMENTS

| | | |
|---|---|---|
| CN | 103188721 A | 7/2013 |
| CN | 103312613 A | 9/2013 |

OTHER PUBLICATIONS

Partial English Translation and Abstract of Chinese Patent Application No. CN101005456, Part 2, Jun. 25, 2016, 2 pages.
Foreign Communication From a Counterpart Application, European Application No. 14868822.9, Extended European Search Report dated Oct. 13, 2016, 8 pages.
Foreign Communication From a Counterpart Application, PCT Application No. PCT/CN2014/081944, English Translation of International Search Report dated Oct. 15, 2014, 2 pages.
Foreign Communication From a Counterpart Application, PCT Application No. PCT/CN2014/081944, English Translation of Written Opinion dated Oct. 15, 2014, 9 pages.

* cited by examiner

DATA TRANSMISSION METHOD AND ROUTER

CROSS-REFERENCE TO RELATED APPLICATIONS

This application is a continuation of International Application No. PCT/CN2014/081944, filed on Jul. 10, 2014, which claims priority to Chinese Patent Application No. 201310673547.3, filed on Dec. 10, 2013, both of which are hereby incorporated by reference in their entireties.

TECHNICAL FIELD

The present disclosure relates to the field of communications technologies, and in particular, to a data transmission method and a router.

BACKGROUND

A virtual private network (VPN) refers to a private network set up on a public network. A common technology for setting up a VPN includes the layer 2 tunneling protocol (L2TP), Internet Protocol security (IPSec), the secure sockets layer (SSL), and the like.

With development of wireless communications technologies, transmission bandwidth of wireless communication continuously increases, and a VPN technology begins to be used in combination with the wireless communications technologies. As shown in FIG. 1, when an enterprise establishes a VPN, a branch router on which a wireless communications module, such as a third generation (3G) mobile communication or long term evolution (LTE) module, is configured is used on the enterprise's branch network. The branch router may access the Internet over a radio link provided by the wireless communications module, and set up the VPN with a headquarters router that is connected to a headquarters network in order to implement data communication between the branch network and the headquarters network. Subscriber identity module (SIM) cards of different telecommunications operators can be respectively inserted into multiple wireless communications modules configured on the branch router. In this way, the branch router can use radio links of different telecommunications operators simultaneously to communicate with the headquarters router, which increases transmission bandwidth between the branch router and the headquarters router.

In a scenario in which the branch router simultaneously uses multiple radio links, the branch router and the headquarters router balance load of the radio links according to bandwidth contracted with the telecommunications operators. When strength of signals received by the branch router over any radio link decreases, or a network standard of the radio link switches to a network standard of a relatively low rate, for example, switches from a 3G standard to a second generation (2G) mobile telecommunications standard, actual bandwidth of the radio link is less than the contracted bandwidth, and link quality deteriorates. In this case, if the branch router or the headquarters router still balances the load of the radio links according to the contracted bandwidth, data transmission efficiency is unsatisfied. For example, contracted bandwidth of a radio link 1 and contracted bandwidth of a radio link 2 of the branch router are both 2 megabit (Mbit)/second (s). When actual bandwidth of the radio link 1 is less than 2 Mbit/s because of signal strength, but actual bandwidth of the radio link 2 is still 2 Mbit/s, the branch router and the headquarters router still perform routing in a polling manner according to the contracted bandwidth, and load of the radio link 1 is the same as that of the radio link 2. In this case, a packet loss may occur on the radio link 1.

SUMMARY

Embodiments of the present disclosure provide a data transmission method and a router, to resolve a problem of a relatively poor load balancing effect that results from determining load of radio links by routers of two communication parties according to contracted bandwidth and improve data transmission efficiency.

According to a first aspect, an embodiment of the present disclosure provides a data transmission method, including communicating, by a first router, with a second router over multiple radio links, acquiring, by the first router, status information of each radio link, determining, by the first router, a transmission overhead of each radio link according to the status information of each radio link, determining, by the first router, load sharing of each radio link according to the transmission overhead of each radio link, and sending, by the first router, data to the second router according to the load sharing of each radio link.

With reference to the first aspect, in a first possible implementation manner of the first aspect, acquiring, by the first router, status information of each radio link includes receiving, by the first router, the status information of each radio link that is sent by the second router.

With reference to the first aspect or the first possible implementation manner of the first aspect, in a second possible implementation manner of the first aspect, the status information includes a network standard and a received signal strength indicator (RSSI), and determining, by the first router, a transmission overhead of each radio link according to the status information of each radio link includes determining, by the first router, a weight corresponding to a network standard of each radio link and a weight corresponding to an RSSI of each radio link, and determining, by the first router, the transmission overhead of each radio link according to the weight corresponding to the network standard of each radio link and the weight corresponding to the RSSI of each radio link.

With reference to the second possible implementation manner of the first aspect, in a third possible implementation manner of the first aspect, the status information further includes connection duration of a radio link or statistics traffic of a radio link, and determining, by the first router, a transmission overhead of each radio link according to the status information of each radio link includes determining, for each radio link, by the first router, whether connection duration of the radio link exceeds a monthly duration quota, or whether statistics traffic of the radio link exceeds a monthly traffic quota, and using, by the first router, a preset upper limit of a transmission overhead as the transmission overhead of the radio link if the connection duration exceeds the monthly duration quota or the statistics traffic exceeds the monthly traffic quota, or determining the weight corresponding to the network standard of the radio link and the weight corresponding to the RSSI of the radio link if the connection duration does not exceed the monthly duration quota or the statistics traffic does not exceed the monthly traffic quota, and determining the transmission overhead of the radio link according to the weight corresponding to the network standard of the radio link and the weight corresponding to the RSSI of the radio link.

With reference to the first aspect and any one of the first to the third possible implementation manners of the first aspect, in a fourth possible implementation manner of the first aspect, after determining, by the first router, load sharing of each radio link according to the transmission overhead of each radio link, the method further includes sending, by the first router, an indication message that includes the load sharing of each radio link to the second router such that the second router sends data according to the load sharing of each radio link.

According to a second aspect, a first router provided in an embodiment of the present disclosure includes a communications connection module configured to communicate with a second router over multiple radio links, a status information acquiring module configured to acquire status information of each radio link, a transmission overhead determining module configured to determine a transmission overhead of each radio link according to the status information of each radio link, a load sharing determining module configured to determine load sharing of each radio link according to the transmission overhead of each radio link, and a data sending module configured to send data to the second router according to the load sharing of each radio link.

With reference to the second aspect, in a first possible implementation manner of the second aspect, the status information acquiring module is further configured to receive the status information of each radio link that is sent by the second router.

With reference to the second aspect or the first possible implementation manner of the second aspect, in a second possible implementation manner of the second aspect, the status information includes a network standard and an RSSI, and the transmission overhead determining module is further configured to determine a weight corresponding to a network standard of each radio link and a weight corresponding to an RSSI of each radio link, and determine the transmission overhead of each radio link according to the weight corresponding to the network standard of each radio link and the weight corresponding to the RSSI of each radio link.

With reference to the second possible implementation manner of the second aspect, in a third possible implementation manner of the second aspect, the status information further includes connection duration of a radio link or statistics traffic of a radio link, and the transmission overhead determining module is further configured to determine whether connection duration of the radio link exceeds a monthly duration quota, or whether statistics traffic of the radio link exceeds a monthly traffic quota for each radio link, and use a preset upper limit of a transmission overhead as the transmission overhead of the radio link if the connection duration exceeds the monthly duration quota or the statistics traffic exceeds the monthly traffic quota, or determine the weight corresponding to the network standard of the radio link and the weight corresponding to the RSSI of the radio link if the connection duration does not exceed the monthly duration quota or the statistics traffic does not exceed the monthly traffic quota, and determine the transmission overhead of the radio link according to the weight corresponding to the network standard of the radio link and the weight corresponding to the RSSI of the radio link.

With reference to the second aspect and any one of the first to the third possible implementation manners of the second aspect, in a fourth possible implementation manner of the second aspect, the first router further includes a load sharing indication module configured to send an indication message that includes the load sharing of each radio link to the second router such that the second router sends data according to the load sharing of each radio link after the load sharing determining module determines the load sharing of each radio link.

According to a third aspect, a first router provided in an embodiment of the present disclosure includes a processor, a memory, and a communications interface, where the processor, the memory, and the communications interface are connected to each other using a bus or in another manner. The memory is configured to store a program. The communications interface is configured to communicate with a second router, and the processor is configured to execute the program stored by the memory, which includes communicating with the second router over multiple radio links, acquiring status information of each radio link, determining a transmission overhead of each radio link according to the status information of each radio link, determining load sharing of each radio link according to the transmission overhead of each radio link, and sending data to the second router according to the load sharing of each radio link.

With reference to the third aspect, in a first possible implementation manner of the third aspect, acquiring status information of each radio link, includes receiving the status information of each radio link that is sent by the second router.

With reference to the third aspect or the first possible implementation manner of the third aspect, in a second possible implementation manner of the third aspect, the status information acquired by the processor includes a network standard and an RSSI, and determining transmission overheads of each radio link according to the status information of each radio link, includes determining a weight corresponding to a network standard of each radio link and a weight corresponding to an RSSI of each radio link, and determining the transmission overhead of each radio link according to the weight corresponding to the network standard of each radio link and the weight corresponding to the RSSI of each radio link.

With reference to the second possible implementation manner of the third aspect, in a third possible implementation manner of the third aspect, the status information acquired by the processor further includes connection duration of a radio link or statistics traffic of a radio link, and determining transmission overheads of each radio link according to the status information of each radio link, includes for each radio link, determining whether connection duration of the radio link exceeds a monthly duration quota, or whether statistics traffic of the radio link exceeds a monthly traffic quota, and using a preset upper limit of a transmission overhead as the transmission overhead of the radio link if the connection duration exceeds the monthly duration quota or the statistics traffic exceeds the monthly traffic quota, or determining the weight corresponding to the network standard of the radio link and the weight corresponding to the RSSI of the radio link if the connection duration does not exceed the monthly duration quota or the statistics traffic does not exceed the monthly traffic quota, and determining the transmission overhead of the radio link according to the weight corresponding to the network standard of the radio link and the weight corresponding to the RSSI of the radio link.

With reference to the third aspect and any one of the first to the third possible implementation manners of the third aspect, in a fourth possible implementation manner of the third aspect, the processor is further configured to send an indication message that includes the load sharing of each radio link to the second router such that the second router sends data according to the load sharing of each radio link after determining the load sharing of each radio link.

In the embodiments of the present disclosure, a transmission overhead of each radio link is determined according to status information of each radio link, and load sharing of each radio link is determined according to the transmission overhead of each radio link. Compared with contracted bandwidth of a radio link, status information of the radio link can reflect a current network status more accurately. Therefore, load sharing finally determined is obtained according to the current network status, and a load sharing scheme is more proper. Data transmission according to the load sharing scheme can improve data transmission efficiency.

DESCRIPTION OF EMBODIMENTS

Embodiments of the present disclosure provide a data transmission method and a router, to properly determine load sharing of each radio link and improve data transmission efficiency.

Figure 2:
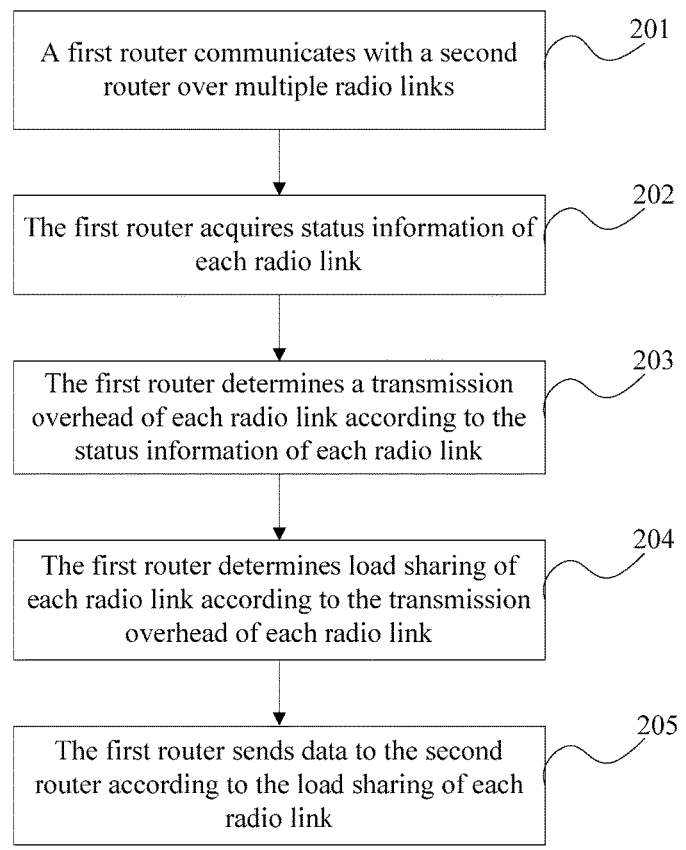
FIG. 2 is a schematic flowchart of a data transmission method according to an embodiment of the present disclosure.

Referring to FIG. 2, a data transmission method provided in an embodiment of the present disclosure includes the following steps.

Step 201: A first router communicates with a second router over multiple radio links.

The first router includes multiple wireless communications modules, or the second router includes multiple wireless communications modules, and a radio link is set up using each wireless communications module. There are multiple data links between the first router and the second router, where each data link includes one radio link.

Step 202: The first router acquires status information of each radio link.

Furthermore, when the second router includes multiple wireless communications modules, the first router receives the status information of each radio link that is sent by the second router. The second router sends the status information of each radio link to the first router according to a preset period, and/or the second router sends the status information of each radio link to the first router when the second router determines that a network standard or an RSSI of any radio link of the multiple radio links changes.

The status information of the radio link includes a network standard and an RSSI, and may further include connection duration of the radio link and/or statistics traffic of the radio link.

The following lists several network standards in the prior art in ascending order of rates a general packet radio service (GPRS), enhanced data rates for global system for mobile communications (GSM) evolution (EDGE) used in a GSM, wideband code division multiple access (WCDMA), evolution-data only (EVDO), high-speed packet access (HSPA), and the like.

Step 203: The first router determines a transmission overhead of each radio link according to the status information of each radio link.

In a case in which RSSIs are the same, a radio link using a higher rate network standard has better link quality, a higher transmission rate, and a lower transmission overhead than a radio link using a lower rate network standard. In a case in which network standards are the same, a radio link with a lower RSSI has better link quality, a higher transmission rate, and a lower transmission overhead.

Optionally, when the received status information of the radio link includes only a network standard and an RSSI, step 203 further includes determining, by the first router, a weight corresponding to a network standard of each radio link and a weight corresponding to an RSSI of each radio link, and determining the transmission overhead of each radio link according to the weight corresponding to the network standard of each radio link and the weight corresponding to the RSSI of each radio link. For example, a sum of the weight corresponding to the network standard of the radio link and the weight corresponding to the RSSI of the radio link is determined as the transmission overhead of the radio link. A weight corresponding to a high-speed network standard is less than a weight corresponding to a low-speed network standard. In a favorable signal condition, an RSSI is lower, and a weight corresponding to the RSSI is smaller.

When the received status information of the radio link further includes connection duration of the radio link or statistics traffic of the radio link, step 203 further includes determining, for each radio link, by the first router, whether connection duration of the radio link exceeds a monthly duration quota, or whether statistics traffic exceeds a monthly traffic quota, and using a preset upper limit of a transmission overhead as the transmission overhead of the radio link if the connection duration exceeds the monthly duration quota or the statistics traffic exceeds the monthly traffic quota, or determining the weight corresponding to the network standard of the radio link and the weight corresponding to the RSSI of the radio link if the connection duration does not exceed the monthly duration quota or the statistics traffic does not exceed the monthly traffic quota, and determining the transmission overhead of the radio link according to the weight corresponding to the network standard of the radio link and the weight corresponding to the RSSI of the radio link. By determining whether connection duration for a current month exceeds the monthly duration quota or whether statistics traffic for a current month exceeds the monthly traffic quota, it can be avoided that a usage fee of the radio link exceeds a budget such that usage costs of a radio resource are reduced. The monthly duration quota or the monthly traffic quota of the radio link is configured on a first router side in advance, or is configured on a second router side in advance and then transmitted to the first router.

In addition, the received status information of the radio link may further include a network standard, an RSSI, connection duration of the radio link, and statistics traffic of the radio link. The first router selects, according to whether the monthly duration quota or the monthly traffic quota of the radio link is recorded on the first router side, the connection duration of the radio link or the statistics traffic of the radio link to perform corresponding determining.

Figure 1:
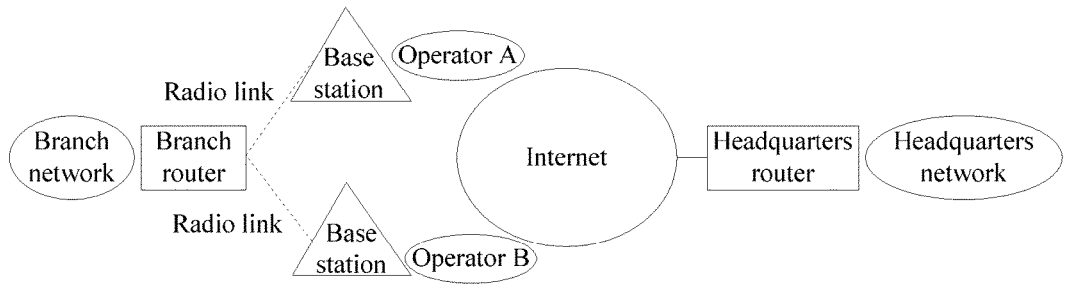
FIG. 1 is a schematic structural diagram of a VPN network using a radio link.

Furthermore, determining a weight corresponding to a network standard of each radio link and a weight corresponding to an RSSI of each radio link includes determining, according to a predetermined ratio of a weight corresponding to each network standard of each radio link to the weight corresponding to the RSSI of each radio link, a weight corresponding to a network standard of any radio link and a weight corresponding to an RSSI of the any radio link. The ratio of the weight corresponding to each network standard of each radio link to the weight corresponding to the RSSI of each radio link is configured on the first router side in advance, or is configured on the second router side in advance and then transmitted to the first router. A scenario shown in FIG. 1 is used as an example. The first router is a headquarters router, and the second router is a branch router. Multiple wireless communications modules are configured on the branch router. The ratio of the weight corresponding to each network standard of each radio link to the weight corresponding to the RSSI of each radio link is configured on the headquarters router in advance. According to the configuration, the headquarters router performs load sharing management on a branch router connected to the headquarters router. Because multiple branch routers may be connected to the headquarters router, storing the configuration on the headquarters router helps a user centrally manage radio links of branch routers.

Step 204: The first router determines load sharing of each radio link according to the transmission overhead of each radio link.

Step 204 further includes determining, by the first router, an overhead ratio between radio links according to the transmission overheads of the radio links, and determining a load ratio between the radio links according to the overhead ratio between the radio links. Further, the first router uses an inverse ratio of the overhead ratio between the radio links as the load ratio between the radio links. For example, it is determined that an overhead of a radio link 1 is 60 and an overhead of a radio link 2 is 70, an overhead ratio of the radio link 1 to the radio link 2 is 6:7, and link quality of the radio link 1 is better than link quality of the radio link 2. In this case, it is determined that a load ratio of the radio link 1 to the radio link 2 is 7:6, and a data transmission rate ratio of the radio link 1 to the radio link 2 is 7:6.

Alternatively, step 204 includes determining, by the first router, a radio link of the best link quality according to the transmission overheads of radio links, preferentially using, by the first router, the radio link of the best link quality to transmit data, and using another radio link and the radio link of the best link quality to jointly transmit the data when a real-time rate of the radio link of the best link quality is higher than contracted bandwidth corresponding to a current network standard of the radio link.

Step 205: The first router sends data to the second router according to the load sharing of each radio link.

In this embodiment of the present disclosure, a transmission overhead of each radio link is determined according to status information of each radio link, and load sharing of each radio link is determined according to the transmission overhead of each radio link. Performing load sharing according to a current network status can improve data transmission efficiency.

For example, an implementation manner of the present disclosure is described in detail using an example in which VPNs are set up between a headquarters network and a branch network in an enterprise as shown in FIG. 1 and a data link carrying the VPN includes a radio link.

A branch router used by the branch network is a 3G router, where the 3G router is connected to wireless networks of both operator A and operator B. There are two radio links between a headquarters router on the headquarters network and the branch router. After initial setup of the VPNs, initial configuration needs to be performed for the headquarters router and the branch router, where configuration content is as follows.

A private Internet Protocol (IP) address of a VPN set up by the branch router using a radio link of the operator A is ip.a2, and a private IP address of a VPN set up using a radio link of the operator B is ip.b2. Local interface addresses of the two VPNs at the headquarters are vpn.a and vpn.b. The headquarters network is network.0, and a mask is mask.0. The branch network is network.1, and a mask is mask.1. A range of a network transmission overhead is defined as 0-255, where a larger numeric value indicates a larger overhead, and an initial overhead value is 10.

A routing table of the initial configuration of the branch router is as follows:

| Destination network | Network mask | Gateway/Interface | Overhead |
| --- | --- | --- | --- |
| network.0 | mask.0 | vpn.a | 10 |
| network.0 | mask.0 | vpn.b | 10 |

A routing table of the initial configuration of the headquarters router is as follows:

| Destination network | Network mask | Gateway/Interface | Overhead |
| --- | --- | --- | --- |
| network.1 | mask.1 | ip.a2 | 10 |
| network.1 | mask.1 | Ip.b2 | 10 |

Traffic contracted with an operator, a contracted time, and weights corresponding to radio network parameters need to be further configured on the headquarters router, as listed in the following table:

| Branch number | Radio link | Contracted traffic (M) | Contracted time (hour) | Contracted bandwidth kilobits per second (Kbps) | Weight of network standard | Weight of RSSI |
| --- | --- | --- | --- | --- | --- | --- |
| 1 | A | 1000 | | GPRS: 100 | GPRS: 60 | RSSI* |
| | B | | 60 | EDGE: 200 | EDGE: 60 | 50% |
| | | | | WCDMA: 300 | WCDMA: 50 | |
| | | | | EVDO: 2000 | EVDO: 30 | |
| | | | | HSPA: 7000 | HSPA: 20 | |
| | | | | LTE: 10000 | LTE: 10 | |

A branch number may be a number for a VPN connection between the headquarters router and the branch network or may be a number for the branch router.

It can be seen that, traffic over a radio link A is limited and connection duration of a radio link B is limited.

The branch router reports, in a periodic manner or when detecting that the RSSI or the network standard changes, status information of a radio link to the headquarters router using a wireless link administration protocol (WLAP) packet, where WLAP carries a network standard, an RSSI, connection duration, and statistics traffic. A specific format of a WLAP packet is as follows:

| Protocol/Port | Length | TLV1 | TLV2 | TLV3 | TLV4 | ... |
|---|---|---|---|---|---|---|

In the foregoing table, "Protocol" refers to a protocol type of the IP corresponding to WLAP, and "Port" refers to a user datagram protocol (UDP) or transfer control protocol (TCP) port number. For example, a protocol is 0x6A or a port number is 0x66AA. "Length" refers to a total length of the WLAP packet and is represented by 2 bytes. A type-length-value (TLV) is further as follows:

| Type code (1 byte) | Length (1 byte) | Value (variable length) |
|---|---|---|
| 1 | 3 | Network standard (1) |
| 2 | 4 | RSSI (2) |
| 3 | 6 | Connection duration (4) |
| 4 | 18 | Statistics traffic (16) |

A type code is represented by 1 byte, and type codes 1, 2, 3, and 4 respectively represent a network standard, an RSSI, connection duration, and statistics traffic. Values of the network standard include: 1. GRPS, 2. EDGE, 3. WCDMA, 4. HSDPA, 5. HSPA, and 6. LTE, the RSSI is in units of decibels-milliwatts (dbm). The connection duration may be in units of minutes, and the statistics traffic may be in units of megabytes (M). A length is represented by 1 byte and is used to record a total quantity of bytes of a TLV of this type. For example, a total quantity of bytes of a TLV for the type code 1 is 3, and a total quantity of bytes of a TLV for the type code 2 is 4. A value length is variable, and lengths of values corresponding to different type codes are different. For example, a value of a network standard is represented by 1 byte, and a value of an RSSI is represented by 2 bytes.

An example of calculating a transmission overhead by the headquarters router is as follows.

According to a WLAP received from a branch 1, the headquarters router acquires the following status information of a link A of the branch 1: used traffic is 10 M, duration is 1 hour, a network standard is HSPA, and a signal RSSI value is 80, and the following status information of a link B: used traffic is 8 M, duration is 1 hour, a network standard is EVDO, and a signal RSSI value is 70.

According to the initial configurations, overheads obtained by calculation are as follows:

Overhead of the link $A=10(\text{initial})+20(\text{HSPA})+80*50\%=70$,

Overhead of the link $B=10(\text{initial})+30(\text{EVDO})+70*50\%=75$.

The refreshed routing table is as follows.

| Destination network | Network mask | Gateway/Interface | Overhead |
|---|---|---|---|
| network.1 | mask.1 | ip.a2 | 70 |
| network.1 | mask.1 | Ip.b2 | 75 |

After the headquarters router calculates the overheads, the headquarters router sends values of the overheads to the branch router using a WLAP packet, and the branch router synchronizes the routing table.

| Destination network | Network mask | Gateway/Interface | Overhead |
|---|---|---|---|
| network.0 | mask.0 | vpn.a | 70 |
| network.0 | mask.0 | vpn.b | 75 |

The headquarters router and the branch router determine the load sharing of the two radio links according to the overheads. A possible manner of load sharing is determining an inverse ratio of the overheads as the load ratio between the two radio links. Another load sharing manner may also be used. For example, a primary link of the two radio links is determined, and data is transmitted preferentially over the primary link. When bandwidth of the primary link is not enough, the other radio link is used to assist the transmission.

In addition, the branch router may calculate the load sharing, and synchronize the load sharing with the headquarters router.

Figure 3:
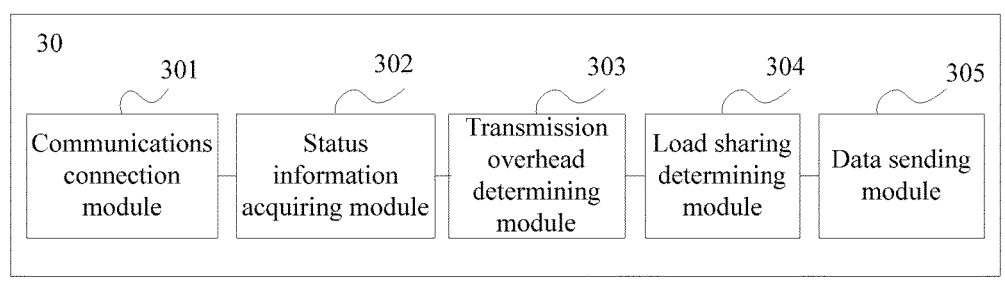
FIG. 3 is a block diagram of a first router according to an embodiment of the present disclosure.

Referring to FIG. 3, an embodiment of the present disclosure provides a first router 30 configured to implement the data transmission method shown in FIG. 2 of the present disclosure, where the first router 30 includes a communications connection module 301 configured to communicate with a second router over multiple radio links, a status information acquiring module 302 configured to acquire status information of each radio link, a transmission overhead determining module 303 configured to determine a transmission overhead of each radio link according to the status information of each radio link, a load sharing determining module 304 configured to determine load sharing of each radio link according to the transmission overhead of each radio link, and a data sending module 305 configured to send data to the second router according to the load sharing of each radio link.

The first router 30 includes multiple wireless communications modules, or the second router includes multiple wireless communications module, and a radio link is set up using each wireless communications module. There are multiple data links between the first router 30 and the second router, where each data link includes one radio link.

When the second router includes multiple wireless communications modules, the first router 30 receives the status information of each radio link that is sent by the second router. When the first router includes multiple wireless communications modules, the first router 30 may acquire the status information of each radio link from the multiple wireless communications modules.

Optionally, the status information acquiring module 302 is further configured to receive the status information of each radio link that is sent by the second router.

The status information includes a network standard and an RSSI, and the transmission overhead determining module 303 is further configured to determine a weight corresponding to a network standard of each radio link and a weight corresponding to an RSSI of each radio link, and determine the transmission overhead of each radio link according to the weight corresponding to the network standard of each radio link and the weight corresponding to the RSSI of each radio link.

The status information further includes connection duration of a radio link or statistics traffic of a radio link, and the transmission overhead determining module 303 is further configured to determine, for each radio link, whether connection duration of the radio link exceeds a monthly duration quota, or whether statistics traffic exceeds a monthly traffic quota, and use a preset upper limit of a transmission overhead as the transmission overhead of the radio link if the connection duration exceeds the monthly duration quota or the statistics traffic exceeds the monthly traffic quota, or determine the weight corresponding to the network standard of the radio link and the weight corresponding to the RSSI of the radio link if the connection duration does not exceed the monthly duration quota or the statistics traffic does not exceed the monthly traffic quota, and determine the transmission overhead of the radio link according to the weight corresponding to the network standard of the radio link and the weight corresponding to the RSSI of the radio link.

The load sharing determining module 304 is further configured to determine an overhead ratio between the radio links according to the transmission overheads of the radio links, and determine a load ratio between the radio links according to the overhead ratio between the radio links.

The first router 30 further includes a load sharing indication module (not shown) configured to send an indication message that includes the load sharing of each radio link to the second router such that the second router sends data according to the load sharing of each radio link after the load sharing determining module determines the load sharing of each radio link.

It should be noted that the first router 30 in this embodiment implements the foregoing method shown in FIG. 2, and the foregoing explanations and limitations of the method are also applicable to the first router in this embodiment.

Figure 4:
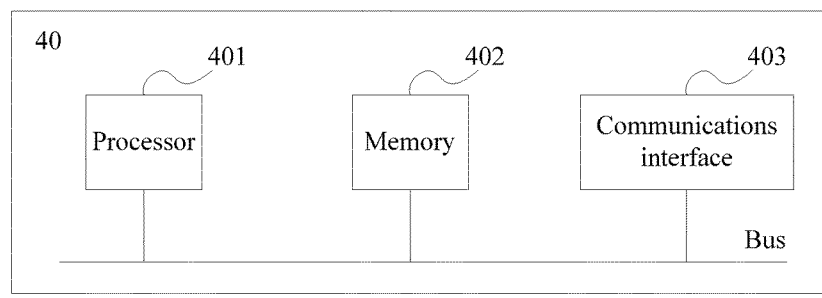
FIG. 4 is a schematic structure diagram of a first router according to an embodiment of the present disclosure.

Referring to FIG. 4, a first router 40 provided in an embodiment of the present disclosure includes a processor 401, a memory 402, and a communications interface 403. The processor 401, the memory 402, and the communications interface 403 are connected to each other using a bus or in another manner. In FIG. 4, that the components are connected to each other using a bus is used as an example.

The memory 402 is configured to store a program. Furthermore, the program may include program code, where the program code includes a computer operation instruction. The memory may include a high-speed random access memory (RAM), and may also include a non-volatile memory, for example, at least one disk memory.

The communications interface 403 is configured to communicate with a second router.

The processor 401 executes the program stored by the memory 402 to implement the data transmission method provided in the embodiment of the present disclosure, which includes communicating with the second router over multiple radio links, acquiring status information of each radio link, determining a transmission overhead of each radio link according to the status information of each radio link, determining load sharing of each radio link according to the transmission overhead of each radio link, and sending data to the second router according to the load sharing of each radio link.

The first router 40 includes multiple wireless communications modules, or the second router includes multiple wireless communications module, and a radio link is set up using each wireless communications module. When the second router includes multiple wireless communications modules, the first router 40 receives the status information of each radio link that is sent by the second router. When the first router 40 includes multiple wireless communications modules, the first router 40 may acquire the status information of each radio link from the multiple wireless communications modules.

The acquiring status information of each radio link includes receiving the status information of each radio link that is sent by the second router.

The status information includes a network standard and a RSSI, and determining a transmission overhead of each radio link according to the status information of each radio link includes determining a weight corresponding to a network standard of each radio link and a weight corresponding to an RSSI of each radio link, and determining the transmission overhead of each radio link according to the weight corresponding to the network standard of each radio link and the weight corresponding to the RSSI of each radio link.

The status information further includes connection duration of a radio link or statistics traffic of a radio link, and determining a transmission overhead of each radio link according to the status information of each radio link includes for each radio link, determining whether connection duration of the radio link exceeds a monthly duration quota, or whether statistics traffic exceeds a monthly traffic quota, and using a preset upper limit of a transmission overhead as the transmission overhead of the radio link if the connection duration exceeds the monthly duration quota or the statistics traffic exceeds the monthly traffic quota, or determining the weight corresponding to the network standard of the radio link and the weight corresponding to the RSSI of the radio link if the connection duration does not exceed the monthly duration quota or the statistics traffic does not exceed the monthly traffic quota, and determining the transmission overhead of the radio link according to the weight corresponding to the network standard of the radio link and the weight corresponding to the RSSI of the radio link.

Determining load sharing of each radio link according to the transmission overhead of each radio link includes determining an overhead ratio between the radio links according to the transmission overheads of the radio links, and determining a load ratio between the radio links according to the overhead ratio between the radio links.

After the determining load sharing of each radio link according to the transmission overhead of each radio link, the data transmission method further includes sending an indication message that includes the load sharing of each radio link to the second router such that the second router sends data according to the load sharing of each radio link.

The processor may be a general purpose processor, including a central processing unit (CPU), a network processor (NP), and the like, or may be a digital signal processor (DSP), an application-specific integrated circuit (ASIC), a field programmable gate array (FPGA), or another programmable logical device, discrete gate or transistor logical device, or a discrete hardware component.

In conclusion, the embodiments of the present disclosure provide a data transmission method and a router, to enable routers of two communication parties to determine load sharing of each radio link according to current status information of a network, which improves data transmission efficiency.

A person skilled in the art should understand that the embodiments of the present disclosure may be provided as a method, a device (system), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A method, comprising:
communicating, by a first router, with a second router over multiple radio links, the multiple radio links comprising a first radio link and a second radio link;
acquiring, by the first router, first status information of the first radio link and second status information of the second radio link, the first status information comprising a first network standard and a first received signal strength indicator (RSSI) of the first radio link, and the second status information comprising a second network standard and a second RSSI of the second radio link;
determining, by the first router, a first transmission overhead of the first radio link based on the first status information by:
determining, by the first router, a first weight corresponding to the first network standard and a second weight corresponding to the first RSSI based on weights corresponding to a plurality of different network standards and a plurality of RSSIs that are predetermined and configured on the first router; and
determining, by the first router, the first transmission overhead according to the first weight and the second weight, the first transmission overheard pertaining to the first network standard and the first RSSI;
determining, by the first router, a second transmission overhead of the second radio link based on the second status information by:
determining, by the first router, a third weight corresponding to the second network standard and a fourth weight corresponding to the second RSSI based on weights corresponding to the different network standards and the RSSIs that are predetermined and configured on the first router; and
determining, by the first router, the second transmission overhead according to the third weight and the fourth weight, the second transmission overheard pertaining to the second network standard and the second RSSI;
determining, by the first router, a load ratio of the first radio link to the second radio link according to the first transmission overhead and the second transmission overhead; and
sending, by the first router, data to the second router using the first radio link and the second radio link according to the load ratio of the first radio link to the second radio link.

2. The method of claim 1, wherein acquiring, by the first router, the first status information and the second status information comprises receiving, by the first router, the first status information and the second status information from the second router.

3. The method of claim 1, wherein the first status information further comprises first connection duration of the first radio link, the second status information further comprises second connection duration of the second radio link, and determining, by the first router, the first transmission overhead based on the first status information comprises:
determining, by the first router, whether the first connection duration exceeds a first monthly duration quota when the first radio link is pre-configured with the first monthly duration quota; and
using, by the first router, a preset transmission overhead upper limit as the first transmission overhead when the first connection duration exceeds the first monthly duration quota, and
wherein determining, by the first router, the second transmission overhead based on the second status information comprises:
determining, by the first router, whether the second connection duration exceeds a second monthly duration quota when the second radio link is pre-configured with the second monthly duration quota; and
using, by the first router, the preset transmission overhead upper limit as the second transmission overhead when the second connection duration exceeds the second monthly duration quota.

4. The method of claim 1, wherein the first status information further comprises first statistics traffic of the first radio link, the second status information further comprises second statistics traffic of the second radio link, and determining, by the first router, the first transmission overhead based on the first status information comprises:
determining, by the first router, whether the first statistics traffic exceeds a first monthly traffic quota when the first radio link is pre-configured with a first monthly duration quota; and using, by the first router, a preset transmission overhead upper limit as the first transmission overhead when the first statistics traffic exceeds the first monthly traffic quota, and wherein determining, by the first router, the second transmission overhead based on the second status information comprises:

determining, by the first router, whether the second statistics traffic exceeds a second first monthly traffic quota when the second radio link is pre-configured with a second monthly traffic quota; and using, by the first router, the preset transmission overhead upper limit as the second transmission overhead when the second statistics traffic exceeds the second monthly traffic quota.

5. The method according of claim 1, wherein the first status information further comprises first connection duration of the first radio link, the second status information further comprises second connection duration of the second radio link, and determining, by the first router, the first transmission overhead based on the first status information comprises:

determining the first weight corresponding to the first network standard and the second weight corresponding to the first RSSI when the first connection duration does not exceed a first monthly duration quota pre-configured to the first radio link; and determining the first transmission overhead according to the first weight and the second weight, and wherein determining, by the first router, the second transmission overhead based on the second status information comprises:

determining the third weight corresponding to the second network standard and the fourth weight corresponding to the second RSSI when the second connection duration does not exceed a second monthly duration quota pre-configured to the second radio link; and determining the second transmission overhead according to the third weight and the fourth weight.

6. The method of claim 1, wherein the first status information further comprises first statistics traffic of the first radio link, the second status information further comprises second statistics traffic of the second radio link, and determining, by the first router, the first transmission overhead based on the first status information comprises:

determining the first weight corresponding to the first network standard and the second weight corresponding to the first RSSI when the first statistics traffic does not exceed a first monthly traffic quota pre-configured to the first radio link; and determining the first transmission overhead of the first radio link according to the first weight and the second weight, and wherein determining, by the first router, the second transmission overhead based on the second status information comprises:

determining the third weight corresponding to the second network standard and the fourth weight corresponding to the second RSSI when the second statistics traffic does not exceed a second monthly traffic quota pre-configured to the second radio link; and determining the second transmission overhead according to the third weight and the fourth weight.

7. The method of claim 1, wherein after determining, by the first router, the load ratio of the first radio link to the second radio link according to the first transmission overhead and the second transmission overhead, the method further comprises sending, by the first router, an indication message that comprises the load ratio to the second router.

8. A first router, comprising:

a processor;

a memory configured to store a program; and a communications interface coupled to the processor and the memory, the communications interface being configured to communicate with a second router, and wherein the processor executes the program stored by the memory to implement data transmission, which comprises the following operations:

communicate with the second router over parallel radio links, the parallel radio links comprising a first radio link and a second radio link;

acquire first status information of the first radio link and second status information of the second radio link, the first status information comprising a first network standard and a first received signal strength indicator (RSSI) of the first radio link, and the second status information comprising a second network standard and a second RSSI of the second radio link;

determine a first transmission overhead of the first radio link based on the first status information by:

determining a first weight corresponding to the first network standard and a second weight corresponding to the first RSSI based on weights corresponding to a plurality of different network standards and a plurality of RSSIs that are predetermined and configured on the first router; and determining the first transmission overhead according to the first weight and the second weight, the first transmission overheard pertaining to the first network standard and the first RSSI;

determine a second transmission overhead of the second radio link based on the second status information by:

determining a third weight corresponding to the second network standard and a fourth weight corresponding to the second RSSI based on weights corresponding to the different network standards and the RSSIs that are predetermined and configured on the first router; and determining the second transmission overhead according to the third weight and the fourth weight, the second transmission overheard pertaining to the second network standard and the second RSSI;

determine a load ratio of the first radio link to the second radio link according to the first transmission overhead and the second transmission overhead; and send data to the second router using the first radio link and the second radio link according to the load ratio of the first radio link to the second radio link.

9. The first router of claim 8, wherein acquiring the first status information and the second status information comprises receiving the first status information and the second status information from the second router.

10. The first router of claim 8, wherein the first status information further comprises first connection duration of the first radio link, the second status information further comprises second connection duration of the second radio link, and determining the first transmission overhead based on the first status information comprising:

determining whether the first connection duration exceeds a first monthly duration quota when the first radio link is pre-configured with the first monthly duration quota; and using a preset transmission overhead upper limit as the first transmission overhead when the first connection duration exceeds the first monthly duration quota, and wherein determining the second transmission overhead based on the second status information comprises:

determining whether the second connection duration exceeds a second monthly duration quota when the second radio link is pre-configured with the second monthly duration quota; and using the preset transmission overhead upper limit as the second transmission overhead when the second connection duration exceeds the second monthly duration quota.

11. The first router of claim 8, wherein the first status information further comprises first statistics traffic of the first radio link, the second status information further comprises second statistics traffic of the second radio link, and determining the first transmission overhead based on the first status information comprises:

determining whether the first statistics traffic exceeds a first monthly traffic quota when the first radio link is pre-configured with a first monthly duration quota; and using a preset transmission overhead upper limit as the first transmission overhead when the first statistics traffic exceeds the first monthly traffic quota, and wherein determining the second transmission overhead based on the second status information comprises:

determining whether the second statistics traffic exceeds a second first monthly traffic quota when the second radio link is pre-configured with a second monthly traffic quota; and using the preset transmission overhead upper limit as the second transmission overhead when the second statistics traffic exceeds the second monthly traffic quota.

12. The first router of claim 8, wherein the first status information further comprises first connection duration of the first radio link, the second status information further comprises second connection duration of the second radio link, and determining the first transmission overhead based on the first status information comprises:

determining the first weight corresponding to the first network standard and the second weight corresponding to the first RSSI when the first connection duration does not exceed a first monthly duration quota pre-configured to the first radio link; and determining the first transmission overhead to the first weight and the second weight, and wherein determining the second transmission overhead based on the second status information comprises:

determining the third weight corresponding to the second network standard and the fourth weight corresponding to the second RSSI when the second connection does not exceed a second monthly duration quota pre-configured to the second radio link; and determining the second transmission overhead according to the third weight and the fourth weight.

13. The first router of claim 8, wherein the first status information further comprises first statistics traffic of the first radio link, the second status information further comprises second statistics traffic of the second radio link, and determining the first transmission overhead based on the first status information comprises:

determining the first weight corresponding to the first network standard and the second weight corresponding to the first RSSI when the first statistics traffic does not exceed a first monthly traffic quota pre-configured to the first radio link; and determining the first transmission overhead of the first radio link according to the first weight and the second weight, and wherein determining the second transmission overhead based on the second status information comprises:

determining the third weight corresponding to the second network standard and the fourth weight corresponding to the second RSSI when the second statistics traffic does not exceed a second monthly traffic quota pre-configured to the second radio link; and determining the second transmission overhead of the second radio link according to the third weight and the fourth weight.

14. The first router of claim 8, wherein the data transmission further comprises sending an indication message that comprises the load ratio to the second router.

15. A data transmission system, comprising:
a first router; and
a second router, configured to communicate with the first router communicates via a plurality of parallel radio links,
wherein the first router is configured to:
communicate with the second router over the parallel radio links, the parallel radio links comprising a first radio link and a second radio link;
acquire first status information of the first radio link and second status information of the second radio link, the first status information comprising a first network standard and a first received signal strength indicator (RSSI) of the first radio link, the first status information further comprising a first connection duration of the first radio link or a first statistics traffic of the first radio link, and the second status information comprising a second network standard and a second RSSI of the second radio link;
determine either whether the first connection duration of the first radio link exceeds a first monthly duration quota when the first radio link is pre-configured with the first monthly duration quota or whether the first statistics traffic of the first radio link exceeds a first monthly traffic quota when the first radio link is pre-configured with the first monthly traffic quota;
use a preset transmission overhead upper limit as a first transmission overhead of the first radio link when the first connection duration exceeds the first monthly duration quota or the first statistics traffic exceeds the first monthly traffic quota;
determine a first weight corresponding to the first network standard and a second weight corresponding to the first RSSI when the first connection duration does not exceed the first monthly duration quota or the first statistics traffic does not exceed the first monthly traffic quota;
determine the first transmission overhead of the first radio link according to the first weight and the second weight, the first transmission overheard pertaining to the first network standard and the first RSSI;

determine a second transmission overhead of the second radio link based on the first status information and the second status information, the second transmission overheard pertaining to the second network standard and the second RSSI;

determine a load ratio of the first radio link to the second radio link according to the first transmission overhead and the second transmission overhead; and send data to the second router using the first radio link and the second radio link according to the load ratio of the first radio link to the second radio link, and wherein the second router is configured to send the first status information and the second status information to the first router according to a preset period and when the second router determines that a network standard or an RSSI of any radio link of the parallel radio links changes.

16. The data transmission system of claim 15, wherein the first router is further configured to:

determine the first weight corresponding to the first network standard, the second weight corresponding to the first RSSI, a third weight corresponding to the second network standard, and a fourth weight corresponding to the second RSSI based on weights corresponding to different network standards and RSSIs that are predetermined and configured on the first router;

determine the first transmission overhead according to the first weight and the second weight; and determine the second transmission overhead according to the third weight and the fourth weight.

17. The data transmission system of claim 15, wherein the first router is further configured to send an indication message that comprises the load ratio to the second router, and the second router is configured to send data according to the load ratio.

18. The method of claim 1, wherein the different network standards comprises one or more of:

a general packet radio service (GPRS);

wideband code division multiple access (WCDMA);

evolution-data only (EVDO);

high-speed packet access (HSPA); or enhanced data rates for global system for mobile communications (GSM) evolution (EDGE).

* * * * *